(12) United States Patent
Muratov

(10) Patent No.: US 10,916,971 B2
(45) Date of Patent: Feb. 9, 2021

(54) WIRELESS POWER TRANSFER ECOSYSTEM AND COILS OPERATING ON SUBSTANTIALLY DIFFERENT POWER LEVELS

(71) Applicant: MEDIATEK Singapore Pte. Ltd, Solaris (SG)

(72) Inventor: Vladimir A. Muratov, Manchester, NH (US)

(73) Assignee: MEDIATEK Singapore Pte. Ltd., Singapore (SG)

( * ) Notice: Subject to any disclaimer, the term of this patent is extended or adjusted under 35 U.S.C. 154(b) by 0 days.

(21) Appl. No.: 16/283,677

(22) Filed: Feb. 22, 2019

(65) Prior Publication Data

US 2019/0296588 A1    Sep. 26, 2019

Related U.S. Application Data

(60) Provisional application No. 62/647,904, filed on Mar. 26, 2018.

(51) Int. Cl.
*H02J 50/10* (2016.01)
*H02J 50/40* (2016.01)
(Continued)

(52) U.S. Cl.
CPC ............. *H02J 50/40* (2016.02); *H01F 27/36* (2013.01); *H01F 38/14* (2013.01); *H02J 50/10* (2016.02);
(Continued)

(58) Field of Classification Search
CPC ....... H01F 27/365; H01F 38/14; H01Q 1/526; H02J 5/005; H02J 7/025; H02J 50/10;
(Continued)

(56) References Cited

U.S. PATENT DOCUMENTS 8,338,990 B2   12/2012   Baarman et al.
8,855,558 B2   10/2014   Baarman
(Continued)

FOREIGN PATENT DOCUMENTS

CN   104167824 A   11/2014
CN   104578449 B    4/2017
(Continued)

OTHER PUBLICATIONS

Partial European Search Report for European Application No. 19165040.7 dated Jul. 22, 2019.
(Continued)

*Primary Examiner* — Levi Gannon
(74) *Attorney, Agent, or Firm* — Wolf, Greenfield & Sacks, P.C.

(57) ABSTRACT

A wireless power transmitter apparatus has a gap separating the first magnetic shield and the second magnetic shield, the gap having a magnetic permeability lower than that of the first magnetic shield and the second magnetic shield. A wireless power receiver apparatus has a conductive region within an area defined by a receive coil, the conductive region sized and positioned to inhibit operation of a wireless power transmitter not configured for wireless power transmission to the receive coil.

13 Claims, 7 Drawing Sheets

(51) Int. Cl.
*H01F 38/14* (2006.01)
*H02J 50/12* (2016.01)
*H01F 27/36* (2006.01)
*H04B 5/00* (2006.01)
*H02J 50/70* (2016.01)
*H02J 50/60* (2016.01)

(52) U.S. Cl.
CPC ............ *H02J 50/12* (2016.02); *H02J 50/402* (2020.01); *H04B 5/0087* (2013.01); *H02J 50/60* (2016.02); *H02J 50/70* (2016.02)

(58) Field of Classification Search
CPC .......... H02J 50/12; H02J 50/40; H02J 50/402; H02J 50/60; H02J 50/70; H04B 5/0087
USPC .......................................................... 307/104
See application file for complete search history.

(56) References Cited

U.S. PATENT DOCUMENTS

| | | |
|---|---|---|
| 9,209,627 B2 | 12/2015 | Baarman et al. |
| 9,231,411 B2 | 1/2016 | Baarman et al. |
| 9,748,774 B2 | 8/2017 | Van Den Brink et al. |
| 9,893,553 B2 | 2/2018 | Pudipeddi et al. |
| 2009/0322280 A1 | 12/2009 | Kamijo et al. |
| 2014/0320369 A1 | 10/2014 | Azenui et al. |
| 2015/0061585 A1 | 3/2015 | Obayashi et al. |
| 2015/0214749 A1 | 7/2015 | Park et al. |
| 2015/0280450 A1 | 10/2015 | Park et al. |
| 2016/0094049 A1 | 3/2016 | Kim |
| 2016/0211702 A1* | 7/2016 | Muratov ................. H02J 50/10 |
| 2017/0033610 A1* | 2/2017 | Borin ...................... H01F 38/14 |
| 2017/0054213 A1* | 2/2017 | Singh .................... H04B 5/0081 |
| 2017/0288465 A1* | 10/2017 | Sugasawa ............. B60L 53/122 |

FOREIGN PATENT DOCUMENTS

| | | |
|---|---|---|
| CN | 207124107 U | 3/2018 |
| EP | 3 096 337 A1 | 11/2016 |
| TW | 201347349 A | 11/2013 |
| TW | 201513467 A | 4/2015 |
| WO | WO 2017/031348 A1 | 2/2017 |

OTHER PUBLICATIONS

EP 19165040.7, Jul. 22, 2019, Partial European Search Report.
EP 19165040.7, Dec. 11, 2019, Extended European Search Report.
Extended European Search Report for European Application No. 19165040.7 dated Dec. 11, 2019.

\* cited by examiner

WIRELESS POWER TRANSFER ECOSYSTEM AND COILS OPERATING ON SUBSTANTIALLY DIFFERENT POWER LEVELS

CROSS-REFERENCE TO RELATED APPLICATIONS

This application claims priority to U.S. provisional application Ser. No. 62/647,904, filed Mar. 26, 2018, titled "WIRELESS POWER TRANSFER ECOSYSTEM AND COILS OPERATING ON SUBSTANTIALLY DIFFERENT POWER LEVELS," which is hereby incorporated by reference in its entirety.

BACKGROUND

1. Technical Field

The techniques described herein relate generally to wireless power delivery, and particularly to apparatus and systems capable of sending and/or receiving power wirelessly at different power levels by different coils.

2. Discussion of the Related Art

Wireless Power Transfer Systems (WPTS) are gaining increasing popularity as convenient way to deliver power without wires or connectors. WPTS currently under development in the industry can be separated in two major classes: magnetic induction (MI) systems and magnetic resonance (MR) systems. Both types of systems include a wireless power transmitter and a wireless power receiver. Such systems can be used to power or charge mobile devices such as smartphones or tablet computers, among other applications.

Inductive WPTS typically operate in an allocated frequency range of several hundred kilohertz using frequency variation as a power flow control mechanism.

MR WPTS typically operate on a single resonant frequency using input voltage regulation to regulate output power. In typical applications, MR WPTS operate at a frequency of 6.78 MHz.

Several industry committees have been working on developing international standards for consumer products based on wireless power transfer.

SUMMARY

Some embodiments relate to a wireless power transmitter apparatus, comprising: a first transmit coil; a first magnetic shield for the first transmit coil; a second transmit coil; a second magnetic shield for the second transmit coil; and a gap separating the first magnetic shield and the second magnetic shield, the gap having a magnetic permeability lower than that of the first magnetic shield and the second magnetic shield.

The first transmit coil may surround the second transmit coil.

The first transmit coil may be disposed on the first magnetic shield and the second transmit coil may be disposed on the second magnetic shield.

The gap may have a magnetic permeability less than 10% of that of the first magnetic shield.

The gap may have a magnetic permeability less than 1% of that of the first magnetic shield.

The wireless power transmitter apparatus may further comprise a conductive region proximate the gap to reduce magnetic coupling between the first and second magnetic shields.

The conductive region may be below the gap.

The conductive region may be at least partially within the gap.

The first magnetic shield may have an annular shape in top view.

The second magnetic shield may have a circular shape in top view.

The first magnetic shield, the second magnetic shield or both the first and second magnetic shields may include at least one magnetic concentrator.

The at least one magnetic concentrator may extend into an interior of the second transmit coil.

The at least one magnetic concentrator may extend around an exterior of the second transmit coil.

The first magnetic shield and the second magnetic shield may have different values of magnetic permeability.

Some embodiments relate to a wireless power receiver apparatus, comprising: a receive coil; and a conductive region within an area defined by the receive coil, the conductive region sized and positioned to inhibit operation of a wireless power transmitter not configured for wireless power transmission to the receive coil.

The conductive region may be below the receive coil.

The conductive region may be concentric with the receive coil.

The conductive region may have a circular shape in top view.

The wireless power receiver apparatus may further comprise a magnetic shield under the receive coil.

The conductive region may be separated from the magnetic shield by a gap.

The conductive region may be sized and positioned to trigger a foreign object detection operation by the wireless power transmitter inhibiting wireless power transfer by the wireless power transmitter.

The foregoing summary is provided by way of illustration and is not intended to be limiting.

BRIEF DESCRIPTION OF DRAWINGS

In the drawings, each identical or nearly identical component that is illustrated in various figures is represented by a like reference character. For purposes of clarity, not every component may be labeled in every drawing. The drawings are not necessarily drawn to scale, with emphasis instead being placed on illustrating various aspects of the techniques and devices described herein.

DETAILED DESCRIPTION

Some WPTS are capable of transmitting power through different coils. For example, a wireless power transmitter may have a first transmit coil for transmitting relatively high levels of power and a second transmit coil for transmitting lower levels of power. For example, a wireless power transmitter may have a first, relatively large coil for transferring relatively high levels of power to devices that are capable of being powered or charged by relatively high power levels, such as a laptop or tablet computer, for example. The wireless power transmitter may have a second, relatively small coil for transferring relatively low levels of power to devices that accept lower power levels, such as a smartphone or wearable device, for example.

Smaller coils may be associated with physically smaller electronic devices which tend to consume less power. Transferring higher power levels by means of small coils can be inefficient. As physically larger electronics devices require more power, larger coils may be more appropriate to facilitate efficient wireless power transfer. Transferring electrical energy wirelessly between two coils of substantially different sizes can also be inefficient, hence it may be more efficient to have corresponding coil dimensions between transmitting and receiving devices. It can also be desirable when designing a charging device to achieve its compatibility with a wide range of mobile devices, i.e., mobile phones, watches, tablet computers, notebooks, etc.

Figure 1A:
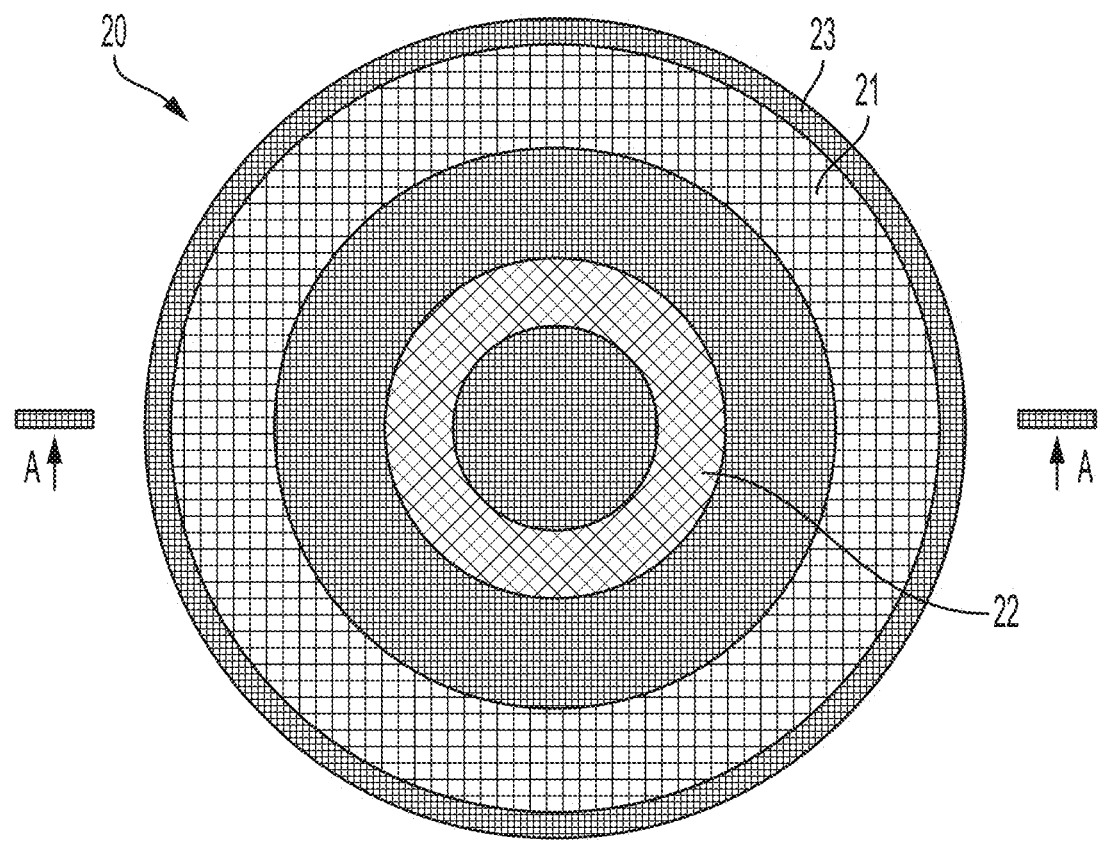
FIGS. 1A and 1B show a top view and cross-sectional view, respectively, of an example of a wireless power transmitter having a plurality of coils that may transmit power wirelessly at different power levels.
Figure 1B:
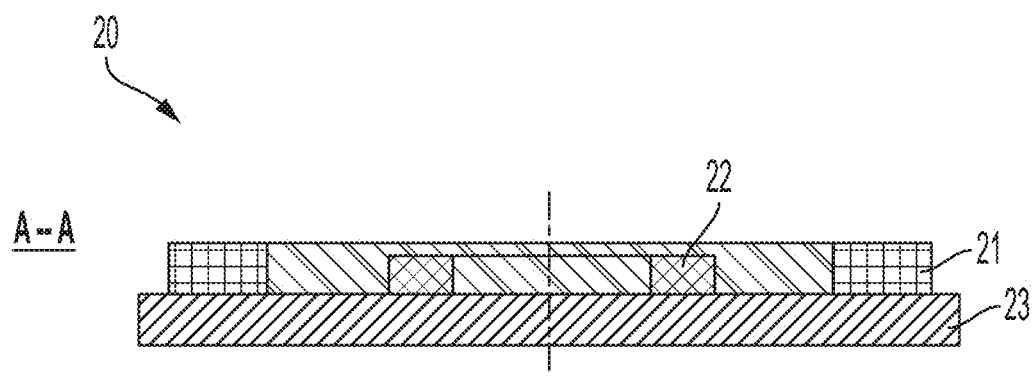

FIGS. 1A and 1B show a top view and cross-sectional view, respectively, of an example of a wireless power transmitter 20 having a plurality of coils that may transmit power wirelessly at different power levels. Wireless power transmitter 20 has a first transmit coil 21 and a second transmit coil 22. In this example, the transmit coils 21 and 22 are each wound in a circular shape when viewed from the top view of FIG. 1A. However, it should be appreciated the shape of the transmit coils 21 and 22 is not limited to a circular shape. The transmit coils 21, 22 may have any suitable number of one or more turns. The transmit coils 21, 22 may be formed of any suitable conductor type such as wires or conductive traces, for example.

As seen in FIGS. 1A and 1B, the first transmit coil 21 is larger than the second transmit coil 22 and surrounds the second transmit coil 22. The transmit coils 21 and 22 may be co-planar, as illustrated in FIG. 1B. The transmit coils 21 and 22 may be concentric, as illustrated in FIG. 1A. However, the techniques described herein are not limited in these respects, as in some embodiments the coils may have a different relative size and/or positions. The first transmit coil 21 may be capable of transmitting relatively high levels of power and the second transmit coil 22 may be capable of transmitting relatively low levels of power (e.g., lower than that of the first coil). Examples of power levels capable of being transmitted by the first and second transmit coils 21 and 22 are 5 W, 15 W, 60 W, and 100 W, with the first transmit coil 21 transmitting a higher power than the second transmit coil 22 transmits. However, this is merely by way of example, as any suitable power levels may be transmitted by the first and second transmit coils 21, 22.

The first and second transmit coils 21, 22 may be disposed on a magnetic shield 23. The magnetic shield 23 may concentrate magnetic flux within the magnetic shield 23 and reduce the strength of the magnetic field below the magnetic shield which may shield electronics (not shown) below the magnetic shield 23 from the magnetic field produced by transmit coils 21, 22. The magnetic shield 23 may be formed of a ferromagnetic material. The magnetic shield 23 may have a relatively high magnetic permeability, such as greater than 10, greater than 100 or greater than 1000. The magnetic shield 23 may be formed of a suitable material such as ferrite, iron, steel, or nickel, or alloys or powdered compounds made of mentioned, or similar materials, by way of example. However, the structures described herein are not limited as to particular materials.

In some embodiments, the magnetic shield 23 may be formed of a flexible ferrite sheet. In some embodiments, the transmit coils 21 and 22 may be formed of a flexible printed circuit. Accordingly, in some embodiments the structure may have a low profile and/or may be flexible.

The inventor has recognized and appreciated that undesired coupling may occur between the first and second transmit coils 21, 22. Since the first and second transmit coils 21, 22 may operate on different power levels, use different frequencies and/or different communication protocols, coupling between the first and second transmit coils 21, 22 may be undesirable. In some embodiments, only one of the first and second transmit coils 21, 22 may transmit at a time. High-voltage commutating switches may be used to disengage the coil not being driven. However, it can be desirable to reduce the voltage rating of the commutating switches or eliminate the need for commutating switches. In some embodiments, the coupling between the first and second transmit coils 21, 22 can be reduced by using the structures and/or techniques described herein.

Figure 2A:
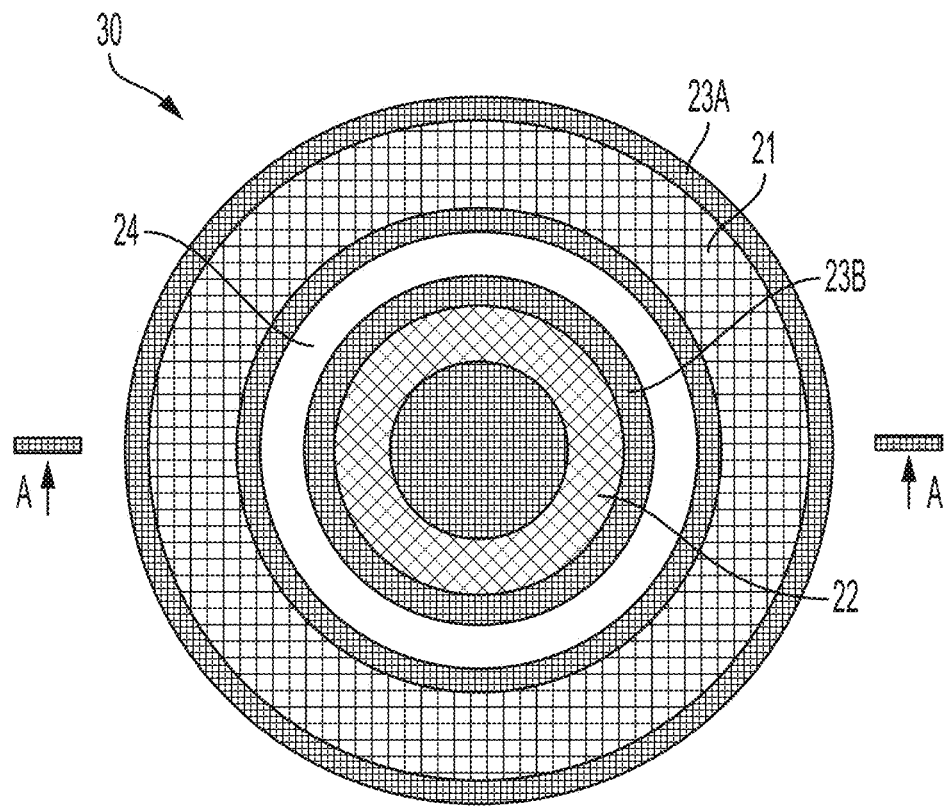
FIGS. 2A and 2B show a top view and a cross-sectional view, respectively, of an example of a wireless power transmitter with a gap of low magnetic permeability separating magnetic shields.
Figure 2B:
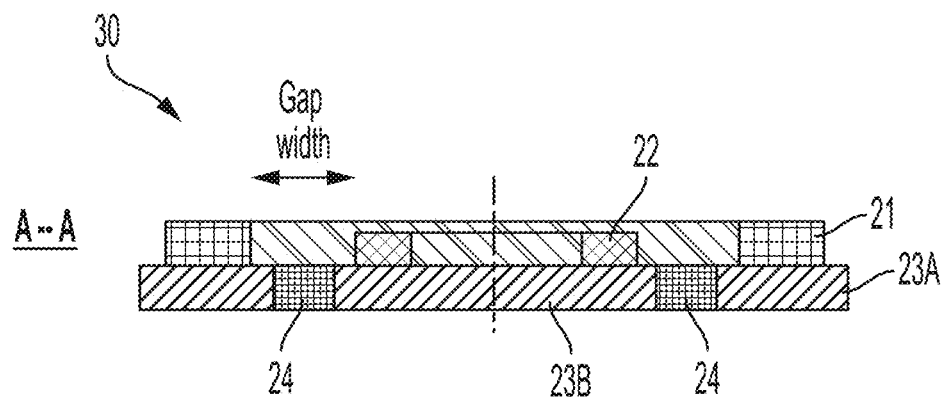

FIGS. 2A and 2B show a top view and a cross-sectional view, respectively, of an example of a wireless power transmitter 30 with a gap 24 of low magnetic permeability separating magnetic shields 23A and 23B. In some embodiments, the gap 24 is magnetically inert. Introducing a gap 24 of low magnetic permeability between magnetic shields 23A and 23B reduces the magnetic coupling between the transmit coils 21, 22. The transmit coils 21, 22 may be modeled as a transformer with a coupling coefficient k. The coupling coefficient K relates the amount of signal that will be induced in one coil 21 or 22 when an alternating current flows in the other coil 21 or 22. A lower coupling coefficient K results in a lower induced signal, while a higher coupling coefficient K results in a higher induced signal. The coupling coefficient K is a parameter that is well known in the art and will not be detailed herein.

As illustrated in FIG. 2A, the gap 24 may have an annular shape when viewed from above. However, the gap 24 need not have an annular shape, as the gap 24 may have any other suitable shape when viewed from above. For example, the inner and/or outer boundaries of the gap 24 may form a polygon shape when viewed from above, or any other suitable shape. The gap 24 may have any suitable width. Those of ordinary skill in the art will appreciate that the gap 24 may be sufficiently wide to reduce the coupling coefficient appreciably. In some embodiments, the width of gap 24 is between 1%-50% of the diameter of the first transmit coil 21 or the second transmit coil 22. However, the structures described herein are not limited as to any particular width of gap 24, as variety of suitable gap widths may be used.

The gap 24 has a magnetic permeability μ lower than that of the magnetic shield 23A or 23B. As an example, the gap 24 may have a magnetic permeability less than 10% or less than 1% of that of the magnetic shields 23A and 23B. As an example, the magnetic shields 23A and 23B may have a magnetic permeability of 1000 and the gap 24 may have a magnetic permeability of less than 10, such as less than 5. As another example, if the gap 24 is an air gap, the magnetic permeability of the gap 24 may be 1. The gap 24 may include any suitable material of low magnetic permeability, such as air, glass, wood, plastics, polymers and many other materials. In some embodiments, the gap may be a vacuum. The electrical conductivity of the gap 24 may be low. Magnetic shields 23A and 23B may have the same magnetic permeability or may have different values of magnetic permeability. In some embodiments, the magnetic shield 23A may have a higher magnetic permeability than that of the magnetic shield 23B. If the magnetic permeability has different values in the magnetic shields 23A and 23B, the magnetic permeability of the gap 24 may be lower than that of both magnetic shields 23A and 23B.

In some embodiments, the wireless power transmitter 30 may include a plurality of low-power transmit coils 22. In such embodiments, the high-power transmit coil 21 may surround all of the low-power transmit coils 22. However, the high-power transmit coil 21 need not surround all of the low-power transmit coils 22.

Figure 3A:
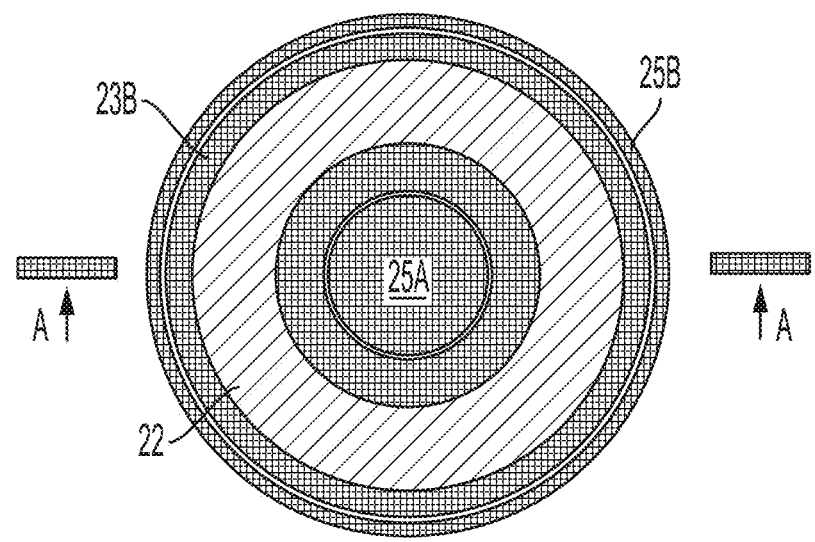
FIGS. 3A and 3B show a top view and cross-sectional view, respectively, of another example of a magnetic shield having one or more field concentrators.
Figure 3B:
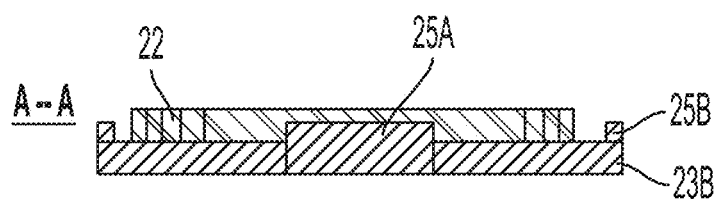

FIGS. 3A and 3B show a top view and cross-sectional view, respectively, of another example of a magnetic shield 23B having one or more field concentrators. The field concentrators may concentrate magnetic flux therein and may reduce coupling between the transmit coils 21, 22. The field concentrators may be one or more portions of magnetic shield 23B extending upward on the interior and/or exterior of the transmit coil 22. The field concentrators may extend upward to the level of the transmit coil 22 as viewed in the cross section of FIG. 3B. FIGS. 3A and 3B show a field concentrator 25A on the interior of the transmit coil 22 and a field concentrator 25B on the exterior of the transmit coil 22. However, a magnetic shield need not have field concentrators on both the interior and exterior of transmit coil 22. For example, a magnetic shield may have only field concentrator 25A or only field concentrator 25B. In some embodiments, the magnetic field concentrators may be formed monolithically with the magnetic shield, 23B, of the same material. Alternatively, the magnetic field concentrators may be separate from the magnetic shield 23B and/or may be formed of a different material. The field concentrators may have any suitable shape. For example, as illustrated in FIG. 3A, field concentrator 25A may have a circular shape when viewed from above and field concentrator 25B may have an annular shape when viewed from above. However, the structures described herein are not limited to particular shapes, as the field concentrators may have inner and/or outer boundaries that take any suitable shape when viewed from above, such as a polygon shape or another shape.

In some embodiments, the magnetic coupling between the transmit coils 21, 22 may be further reduced by positioning an electrically conductive region within or proximate the gap 24. When either transmit coil 21 or 22 is driven with an alternating current, a first magnetic field is produced in and near the gap that induces eddy currents in the electrically conductive region. The eddy currents in the electrically conductive region produce a second magnetic field opposing the first magnetic field. As a result of partial cancellation of the magnetic field, the magnetic coupling between the first and second transmit coils 21, 22 is reduced.

Figure 4A:
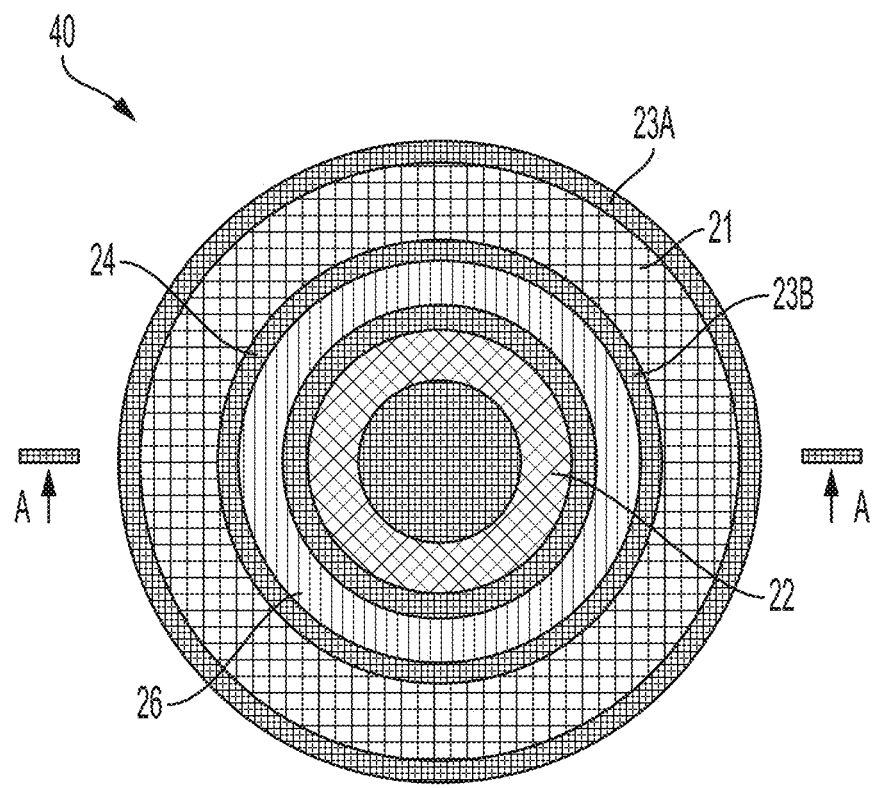
FIGS. 4A and 4B show a top view and cross-sectional view, respectively, of a wireless power transmitter that includes a conductive region.
Figure 4B:
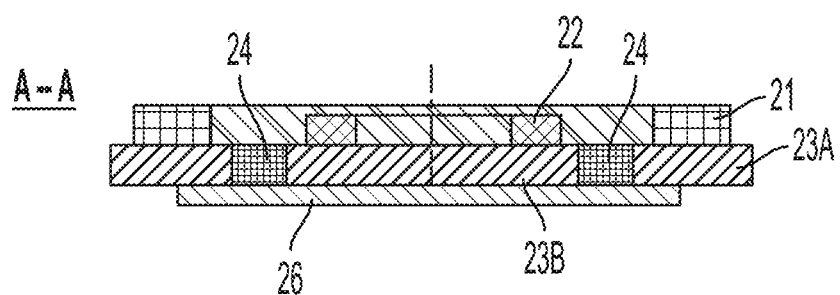
Figure 4C:
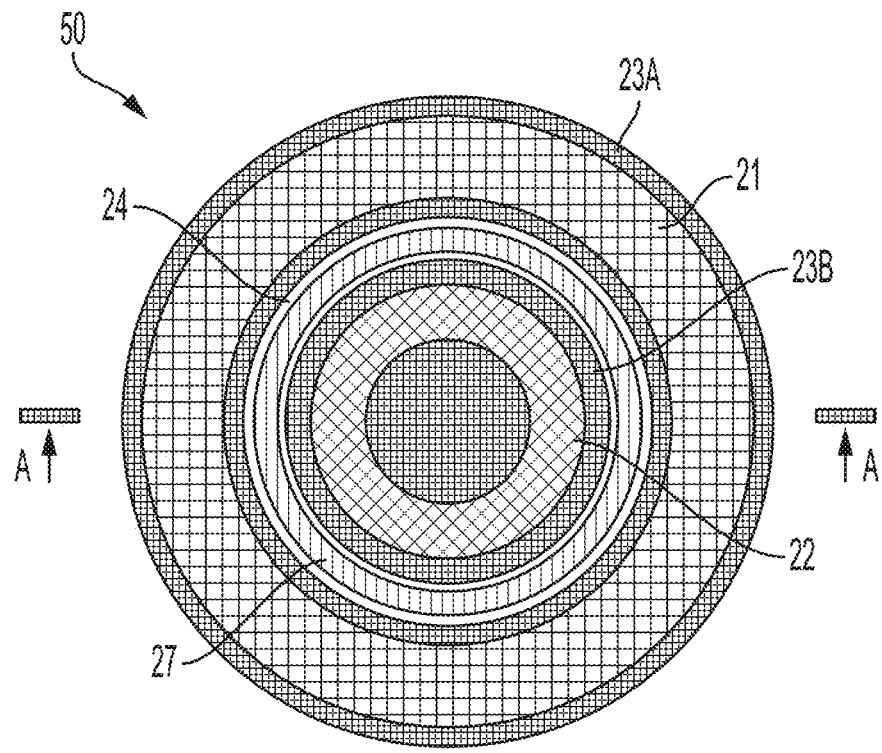
FIGS. 4C and 4D show a top view and cross-sectional view, respectively, of a wireless power transmitter in which a conductive region is within the gap.
Figure 4D:
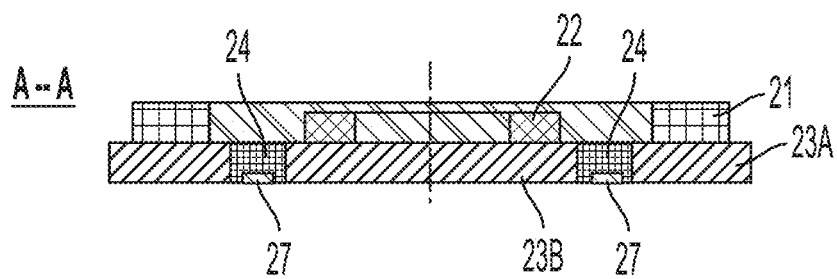

FIGS. 4A and 4B show a top view and cross-sectional view, respectively, of a wireless power transmitter 40 that includes a conductive region 26. Conductive region 26 may be positioned below the magnetic shields 23A and 23B and the gap 24. As shown in FIG. 4B, the conductive region 26 is positioned just below the gap 24, which reduces coupling between the first and second transmit coils 21, 22, as discussed above. The conductive region 26 has a circular shape in this example. However, the conductive region may have any suitable shape such as an annular shape, a polygon shape, an elliptical shape, or any other suitable shape. The magnetic shields 23A, 23B may be affixed (e.g., adhered) to the conductive region or attached in another manner. Conductive region 26 completely covers the gap 24. The conductive region may completely cover the gap 24 or may partially cover the gap 24, in the sense of horizontal extent of the conductive region 26 and gap 24. FIGS. 4C and 4D show an example of a conductive region 27 that does not completely cover the gap 24.

FIGS. 4C and 4D show a top view and cross-sectional view, respectively, of a wireless power transmitter 50 in which a conductive region 27 is within the gap 24. In this example, conductive region 27 is completely within the gap 24. The conductive region 27 may be completely within the gap 24 or partially within the gap 24. In this example, the conductive region has an annular shape. In some embodiments, the conductive region 27 may be positioned closer to the transmit coil 21 than to the transmit coil 22. In some embodiments, the conductive region 27 may be positioned closer to the transmit coil 22 than to the transmit coil 21. In some embodiments, the conductive region 27 may be positioned equidistant from the transmit coils 21 and 22. In some embodiments, the conductive region may have a low aspect ratio, as illustrated in FIG. 4D, in which the conductive region 27 is wider than it is tall (e.g., by a factor of 2:1 or greater). In some embodiments, the conductive region 27 may have a high aspect ratio in which the conductive region 27 is taller than it is wide (e.g., by a factor of 2:1 or greater). In some embodiments, a wireless power transmitter may include both a conductive region 26, as shown in FIGS. 4A and 4B, and a conductive region 27, as shown in FIGS. 4C and 4D. The conductive region may be formed on a substrate (not shown) or otherwise disposed in the gap. Similarly, the magnetic shields 23A and 23B may be formed on a substrate (not shown) in this embodiment and any of the preceding embodiments.

The conductive regions described herein, such as conductive regions 26 and 27, may be formed of any suitable conductive material, such as a metal (e.g., copper, aluminum, etc.) or semiconductor material, for example. However, the conductive regions described herein are not limited as to particular materials.

Table 1 shows the coil-to-coil coupling coefficients K for a geometry without magnetic concentrators in three different transmitter geometry configurations and three different wireless power receiver options.

The three wireless power receiver options shown are the following.

1. No RX device: No wireless power receiver device is present
2. With LP RX: With a low power receiver device present suitable for receiving power from transmit coil 22.
3. With HP RX: With a high power receiver device present suitable for receiving power from transmit coil 21.

The transmitter geometry configurations are as follows.
1. Common shield: geometry as shown in FIGS. 1A and 1B.

2. Air Gap: geometry as shown in FIGS. 2A and 2B.
3. Air Gap and Conductive Circle: geometry as shown in FIGS. 4A and 4B.

TABLE 1

| | TX Coil-to Coil Coupling | | |
|---|---|---|---|
| Sample 1 | Common Shield (Prior Art) | Air Gap | Air Gap & Conductive ring |
| No RX Device | 0.336 | 0.209 | 0.093 |
| With LP RX | 0.360 | 0.271 | 0.116 |
| With HP RX | 0.380 | 0.311 | 0.125 |

Table 2 shows results for the same wireless power receiver options as Table 1, with the following transmitter geometry configurations.

The transmitter geometry configurations are as follows.
1. Air Gap: geometry as shown in FIGS. 2A and 2B.
2. Air Gap and Conductive Strip: geometry as shown in FIGS. 4C and 4D.
3. Air Gap and Conductive Circle: geometry as shown in FIGS. 4A and 4B.

TABLE 2

| | TX Coil-to-Coil Coupling | | |
|---|---|---|---|
| Sample 2 | Air Gap | Air Gap & Conductive Strip | Air Gap & Conductive Ring |
| No RX Device | 0.246 | 0.202 | 0.200 |
| With LP RX | 0.261 | 0.230 | 0.213 |
| With HP RX | 0.305 | 0.244 | 0.238 |

The experimental results show a reduction coil-to-coil coupling coefficient by a factor of ~1.5 for the embodiments with a gap and by a factor of about ~3 for the embodiments with a gap and conductive region. As an example, the gap 24 may reduce the coupling coefficient K by 20% to 100%. The conductive region may further reduce the coupling coefficient K by 50% to 150%.

The inventor has also recognized and appreciated that a wireless power transmitters configured to transmit low power levels (e.g., having a transmit coil 22) may be activated by the presence of a high-power wireless power receiver. For example, low-power legacy wireless power transmitters may not have the capability of detecting whether a wireless power receiver is a low-power wireless power receiver or a high-power wireless power receiver. Activation of a low-power wireless power transmitter by the presence of a high-power wireless power receiver may be undesirable as it may produce unintended operation of the wireless power receiver or wireless power transmitter.

In some embodiments, a wireless power receiver may include a conductive region disposed such that when the wireless power receiver is positioned near a wireless power transmitter having a (relatively small) transmit coil 22, the wireless power transmitter will detect the conductive region as a foreign object and prevent or stop wireless power transmission.

Figure 5A:
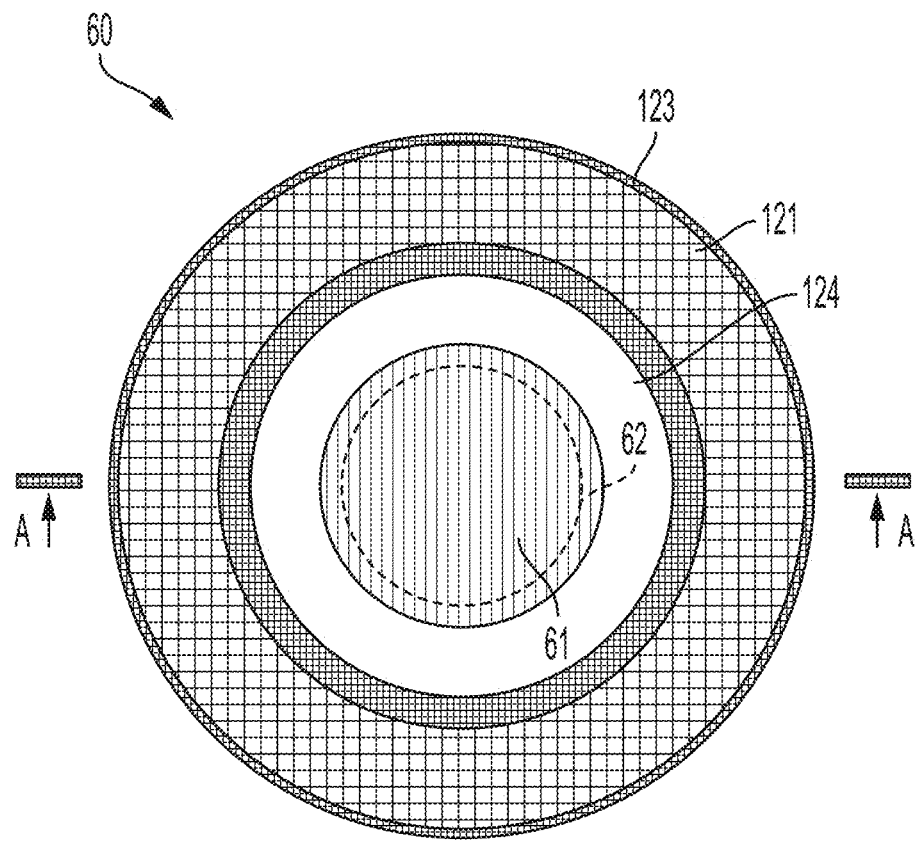
FIGS. 5A and 5B show a top view and a cross-sectional view, respectively, of an example of a wireless power receiver having a conductive region.
Figure 5B:
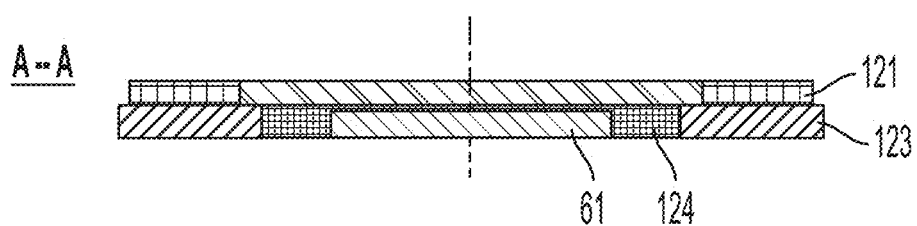

FIGS. 5A and 5B show a top view and a cross-sectional view, respectively, of an example of a wireless power receiver 60 having a conductive region 61. Conductive region 61 may be sized and shaped such that a low-power transmit coil of a wireless power transmitter placed in the proximity of conductive region 61 will detect conductive region 61 as a foreign object and inhibit wireless power transfer. FIG. 5A illustrates the area 62 of conductive region 61 covered by a low-power receive coil in one example in which the conductive region 61 fully covers area 62. However, conductive region 61 need not fully cover area 62, as in some embodiments less than full coverage of area 62 is sufficient for the transmit coil to detect conductive region 61 as a foreign object. As shown in FIG. 5A, the conductive region 61 may be circular in a top view. However, the conductive region 61 need not be circular, and may be any suitable shape such as a polygon shape or another shape. As shown in FIG. 5B, the conductive region 61 may be located below the level of the receive coil 121, for example at the level of the magnetic shield 123, to avoid magnetic coupling between the receive coil 121 and the conductive region 61. Conductive region 61 may be formed of any suitable conductive material, such as a metal or semiconductor material, for example. However, the conductive regions described herein are not limited as to particular materials.

The wireless power receiver also includes a receive coil 121, which may be a high-power receive coil. The receive coil 121 may be disposed on a magnetic shield 123. The receive coil 121 may be affixed to one side of the magnetic shield 123. The magnetic shield 123 may have one or more field concentrators, as discussed above. The magnetic shield 123 may be disposed on a substrate (not shown).

Those of ordinary skill in the art will appreciate that wireless power transmitters and receivers also include additional electronics not described above or shown in the above-described figures. Further description of the electronics and operation of the wireless power transmitters and receivers is provided below.

Figure 6:
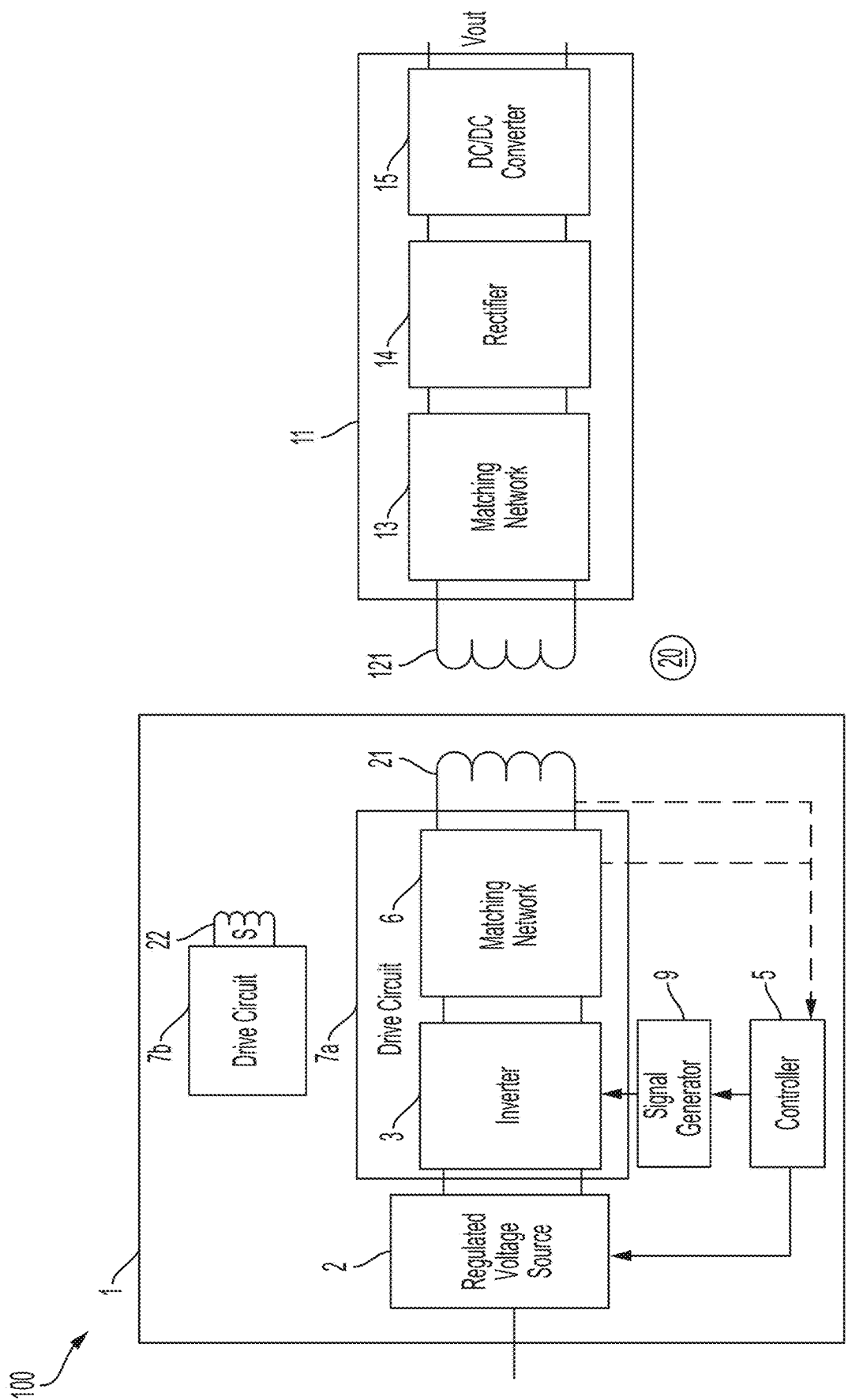
FIG. 6 shows a block diagram of a wireless power system including a wireless power transmitter and a wireless power receiver.

FIG. 6 shows a block diagram of a wireless power system 100 including a wireless power transmitter 1 and a wireless power receiver 11. The wireless power transmitter 1 has a drive circuit 7a including an inverter 3 that drives a high power transmit coil 21 through a matching network 6. The wireless power transmitter 1 may include a regulated voltage source 2 (e.g., a voltage regulator) that provides a regulated DC voltage to the inverter 3. The regulated voltage source 2 produces a regulated DC output voltage in response to control stimulus from the controller 5. In some embodiments, the drive circuit 7a may be a class D or E amplifier that converts the DC voltage at the input of inverter 3 into an AC output voltage to drive the high-power transmit coil 21. Producing an AC output voltage enables wireless power transmission through electromagnetic induction. The controller 5 may control a signal generator 9 to drive the inverter 3 with signals of a selected wireless power transmission frequency. As an example, the inverter 3 may be switched at a frequency between 100 and 205 kHz to transmit power to a wireless power receiver designed to receive wireless power according to the Qi specification for low power Qi receivers and 80-300 kHz for medium power Qi receivers. The inverter 3 may be switched at a higher frequency, such as a frequency of greater than 1 MHz, within an ISM band, e.g., 6.765 MHz to 6.795 MHz, to transmit power to a receiver designed to receive wireless power using MR technology. However, these frequencies are described merely by way of example, as wireless power may be transmitted at a variety of suitable frequencies, in accordance with any suitable specification. Controller 5 may be an analog circuit or a digital circuit. Controller 5 may be programmable, and may command signal generator 9 to produce signals at a desired transmission frequency based on stored program instructions, so that inverter 3 switches at the desired transmission frequency. Matching network 6 may facilitate wireless power delivery by presenting a suitable impedance to the inverter 3. The matching network(s) may have one or more capacitive or inductive elements or any suitable combination of capacitive and inductive elements. Since the transmit coil 21 may have an inductive impedance, in some embodiments the matching network 6 may include one or more capacitive elements, which, when combined with the impedance(s) of the transmit coil 10, presents an impedance to the output of inverter 3 suitable for driving the transmit coil 10. In some embodiments, during wireless power transfer the resonant frequency of the matching network 6 may be set equal to or approximately equal to the switching frequency of the inverter 3. The transmit coil 21 may be realized by any suitable type of conductors. The conductors may be wires, including solid wire or Litz wire, or patterned conductors, such as patterned conductors of a PC board or an integrated circuit.

Similarly, the low power transmit coil 22 may have a drive circuit 7b, which may be the same or different from drive circuit 7a. Drive circuit 7b may be controlled by controller 5 and signal generator 9 or by a different controller and/or signal generator. Drive circuit 7b may receive power from a regulated voltage source which may be the same as regulated voltage source 2 or a different regulated voltage source.

The AC current in the transmit coil 21 or 22 generates an oscillating magnetic field in accordance with Ampere's law. The oscillating magnetic field induces an AC voltage into a receiver coil 121 of the wireless power receiver 11 in accordance with Faraday's law. The AC voltage induced in the receiver coil 121 is provided through a matching network 13 to a rectifier 14 that generates an unregulated DC voltage. Rectifier 14 may be a synchronous rectifier or may be implemented using diodes. The unregulated DC voltage is regulated using a DC/DC converter 15, the output of which may be filtered and provided to a load as output voltage Vout. In some alternate embodiments the DC/DC converter 15 can be replaced by a linear regulator or battery charger, or eliminated altogether. In some embodiments, the wireless power transmitter receiver 1 may have communication circuitry (e.g., within controller 5) for communicating with wireless power receiver 11 either through in-band communication or out of band communication. Similarly, wireless power receiver 11 may have communication circuitry for communicating with a wireless power transmitter 1. The wireless power receiver 11 may send feedback information to the wireless power transmitter 1 indicating the power demanded at the wireless power receiver 11, or a change in the power level to be provided. In response, the wireless power transmitter 1 may increase or decrease its power output accordingly. The wireless power transmitter 1 may control the amount of power transmitted by varying the voltage drive level, the frequency of the signal transmitted or both. Any suitable power control techniques may be used.

As shown in FIG. 6, if a conductive foreign object 20 enters the field produced by the transmit coil 21 or 22 of the wireless power transmitter 1, the wireless power transmission efficiency may be degraded and/or the conductive foreign object 20 may undergo significant heating. Examples of conductive foreign objects 20 include coins, paperclips, and keys, by way of illustration. As discussed above, conductive region 61 of wireless power receiver 60 may be detected as a foreign object by some wireless power transmitters.

According to the techniques described herein, the wireless power transmitter 1 may be controlled to perform foreign object detection prior to wireless power transmission. Performing foreign object detection allows the wireless power transmitter to determine whether or not to perform wireless power transmission. Generally, foreign object detection may involve the wireless power transmitter transmitting a signal and determining whether the quality factor or resonance frequency of the system indicates significant loss due to a foreign object. Foreign object detection techniques are known and will not be detailed herein. If a foreign object is determined to be present, wireless power transmission can be disabled by the wireless power transmitter. If a foreign object is determined not to be present, wireless power transmission may be enabled.

As discussed above, a multi-mode wireless power transmitter may be controlled using controller 5, which may be implemented by any suitable type of circuitry. For example, the controller 5 may be implemented using hardware or a combination of hardware and software. When implemented using software, suitable software code can be executed on any suitable processor (e.g., a microprocessor) or collection of processors. The one or more controllers can be implemented in numerous ways, such as with dedicated hardware, or with general purpose hardware (e.g., one or more processors) that is programmed using microcode or software to perform the functions recited above.

In this respect, it should be appreciated that one implementation of the embodiments described herein comprises at least one computer-readable storage medium (e.g., RAM, ROM, EEPROM, flash memory or other memory technology, or other tangible, non-transitory computer-readable storage medium) encoded with a computer program (i.e., a plurality of executable instructions) that, when executed on one or more processors, performs the above-discussed functions of one or more embodiments. In addition, it should be appreciated that the reference to a computer program which, when executed, performs any of the above-discussed functions, is not limited to an application program running on a host computer. Rather, the terms computer program and software are used herein in a generic sense to reference any type of computer code (e.g., application software, firmware, microcode, or any other form of computer instruction) that can be employed to program one or more processors to implement aspects of the techniques discussed herein.

Various aspects of the apparatus and techniques described herein may be used alone, in combination, or in a variety of arrangements not specifically discussed in the embodiments described in the foregoing description and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A wireless power transmitter apparatus, comprising:
    a first transmit coil;
    a first magnetic shield for the first transmit coil;
    a second transmit coil;
    a second magnetic shield for the second transmit coil;
    a gap separating the first magnetic shield and the second magnetic shield, the gap having a magnetic permeability lower than that of the first magnetic shield and the second magnetic shield; and
    a conductive region proximate the gap to reduce magnetic coupling between the first and second magnetic shields.

2. The wireless power transmitter apparatus of claim 1, wherein the first transmit coil surrounds the second transmit coil.

3. The wireless power transmitter apparatus of claim 1, wherein the first transmit coil is disposed on the first magnetic shield and the second transmit coil is disposed on the second magnetic shield.

4. The wireless power transmitter apparatus of claim 1, wherein the gap has a magnetic permeability less than 10% of that of the first magnetic shield.

5. The wireless power transmitter apparatus of claim 4, wherein the gap has a magnetic permeability less than 1% of that of the first magnetic shield.

6. The wireless power transmitter apparatus of claim 1, wherein the conductive region is below the gap.

7. The wireless power transmitter apparatus of claim 1, wherein the conductive region is at least partially within the gap.

8. The wireless power transmitter apparatus of claim 1, wherein the first magnetic shield has an annular shape in top view.

9. The wireless power transmitter apparatus of claim 1, wherein the second magnetic shield has a circular shape in top view.

10. The wireless power transmitter apparatus of claim 1, wherein the first magnetic shield, the second magnetic shield or both the first and second magnetic shields includes at least one magnetic concentrator.

11. The wireless power transmitter apparatus of claim 10, wherein the at least one magnetic concentrator extends into an interior of the second transmit coil.

12. The wireless power transmitter apparatus of claim 10, wherein the at least one magnetic concentrator extends around an exterior of the second transmit coil.

13. The wireless power transmitter apparatus of claim 1, wherein the first magnetic shield and the second magnetic shield have different values of magnetic permeability.

* * * * *